April 22, 1958     F. W. TRUESDELL     2,831,362
NON-JAMMING GEAR TRAIN
Filed Oct. 18, 1955
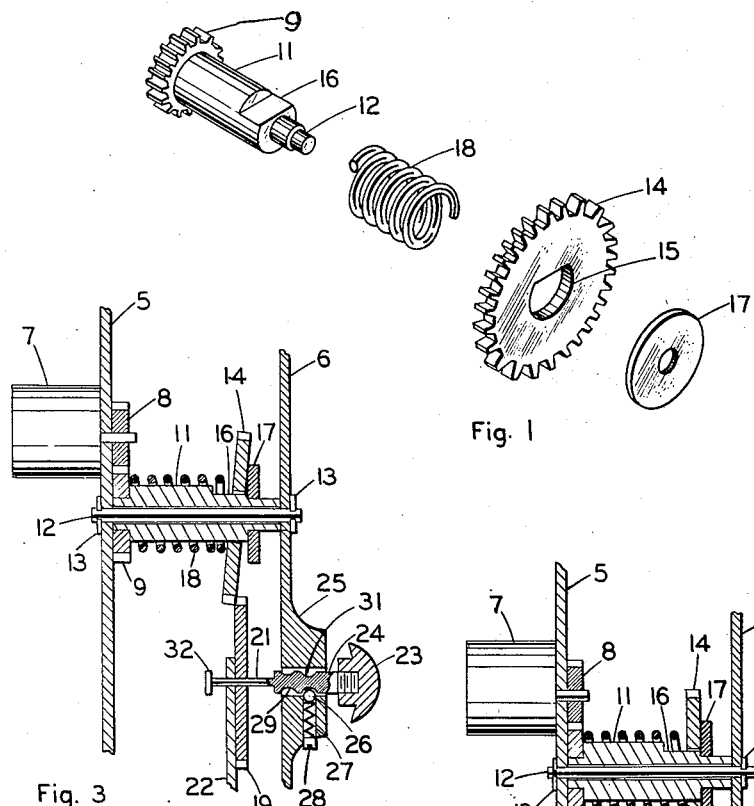
Fig. 1
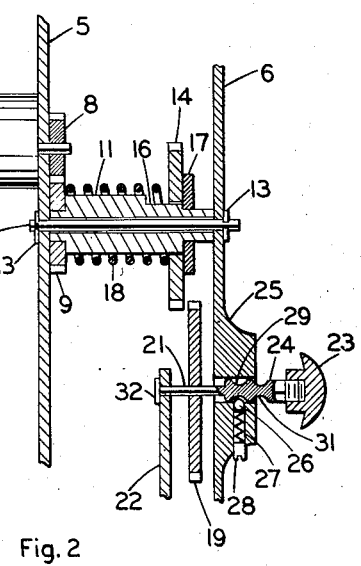
Fig. 2
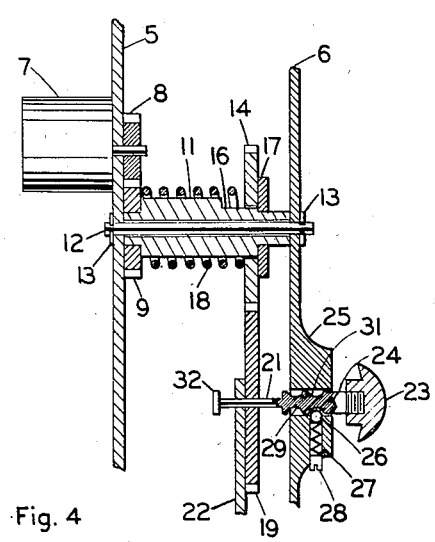
Fig. 3
Fig. 4
Inventor:
Francis W. Truesdell
by. *Richard E. Hosley*
His Attorney United States Patent Office 2,831,362
Patented Apr. 22, 1958

2,831,362

NON-JAMMING GEAR TRAIN

Francis W. Truesdell, Dover, N. H., assignor to General Electric Company, a corporation of New York Application October 18, 1955, Serial No. 541,190

2 Claims. (Cl. 74—405)

This invention relates to non-jamming arrangements for gear trains and has for its object the provision of a reliable, easy to manufacture, and low cost non-jamming arrangement.

In brief, the invention comprises a pair of gears adapted to rotate about parallel axes, one of which is movable with respect to the other to allow the gears to be selectively engaged and disengaged. One of the gears is tiltable about its axis of rotation to permit it to move away from the other upon any tendency of the teeth of the two gears to jam together upon engagement of the gears. In addition, the tiltable gear is normally biased toward the other gear so that the gears will snap into engagement once their teeth are in proper position for engagement.

The object of the invention, together with the benefits and advantages to be derived therefrom, will be readily understood upon reference to the detailed description of the invention set forth below, particularly when taken in conjunction with the drawing annexed hereto, in which:

Figure 1 is an exploded view, in perspective, of one part of a gear train, showing the manner in which a gear is tiltably mounted on its driving shaft, and;

Figure 2 is a partial view, in section, of the complete non-jamming gear train, showing the gears in their disengaged position, and;

Figure 3 is a view similar to Figure 2, showing the gears in position for engagement, but with the tiltable gear of Figure 1 in its non-jamming position, and;

Figure 4 is a view similar to Figure 3, showing the gears in engagement with one another.

Referring now to the drawings, it is seen that a gear train is rotatably mounted between a pair of spaced support plates 5, 6 on one of which is rigidly attached, by any suitable means, a source of motive power for the gear train, which in the illustrated embodiment is a conventional electric timer motor 7. Motor 7 has a pinion 8 rigidly attached to its output shaft and this pinion in turn engages a pinion 9 rigidly mounted on a shoulder at one end of a hollow shaft 11 that is rotatably mounted on the pin shaft 12 extending between plates 5, 6. Pin shaft 12 is held in position between the plates by means of a pair of conventional C-washers 13 cooperating with the grooved ends of the shaft.

Mounted on the other end of shaft 11 is a tiltable gear 14 provided with a D-shaped central aperture 15 that surrounds a flatted portion 16 of shaft 11. The flatted portion extends along the shaft for a distance greater than the thickness of gear 14 and is provided by cutting away a portion of the shaft in the form of a segment having a radial height of approximately one-fifth the diameter of the shaft. The end of the shaft extending away from the flatted portion is reduced to form a mounting shoulder for a restraining washer 17 staked thereto. A compression spring 18 surrounds the shaft 11 between pinion 9 and gear 14, having its ends resting against the inner faces of the pinion and gear. The aperture 15 is slightly larger than the portion of shaft 11 which it surrounds, having a clearance of about .006 inch in one commercial form of the invention, in which the shaft 11 has a diameter of .250 inch and the gear 14 has an outer diameter of about .262 inch.

From the above, it is seen that the gear 14 is effectively keyed to shaft 11 and turns therewith in response to action of the timing motor 7. The spring 18 biases the gear 14 against washer 17 and the parts will remain in their relative positions indefinitely, in the absence of any forces opposing the thrust exerted by the spring on the gear.

In Figures 2, 3, and 4, it is seen that a gear 19 is also arranged between the plates 5, 6 and is adapted to selectively engage gear 14 when it is moved from a first normally disengaged position shown in Figure 2 to a second engaged position shown in Figure 4. Gear 19 is rigidly fastened to a shaft 21 suitably journalled for rotation between one of the main support plates 6 and an auxiliary support plate 22. Shaft 21 is parallel to shaft 11 and is adapted to be selectively moved by a manually adjustable control knob 23 affixed to its enlarged outer end 24. The enlarged end 24 extends through a boss 25 formed on plate 6 and arranged thereon to provide supporting structure for a detent mechanism utilized to retain the shaft 21 in either of two positions. The detent comprises a spring loaded ball 26 riding in an annular slot 27 and held in place by a screw 28. A pair of spaced circular grooves 29, 31 are provided in shaft 21 to cooperate with the ball 26 to hold the shaft in either of two positions and an enlarged member 32 attached to the inner end of shaft 21 cooperates with plate 22 to limit the outward motion of the shaft.

From the arrangements so far described, it is apparent that the gear 14 may be continuously driven by the motor 7 but the gear 19 will remain stationary so long as the shaft 21 is in its outer position established by the detent ball 26 and groove 29. Thus, the gears 14 and 19 are normally disengaged when they occupy the first relative position shown in Figure 2.

When it is desired to engage the gears 14, 19 the knob 23 and its associated shaft 21 may be pushed inwardly to a second position established by groove 31 and detent ball 26, in which position the gear 19 is adapted to engage gear 14 and be driven thereby. If the teeth of the two gears are not in proper alignment for engagement, the side faces of the teeth will tend to jam against one another, but no jamming will occur in view of the fact that gear 14 will tilt around its axis to prevent any possible jamming. This position of the parts is clearly shown in Figure 3, and it is to be noted that the clearance between aperture 15 and shaft flat 16 permits the gear 14 to tilt, as required. The parts will not remain long in this position, for the gear 14 is continuously moving, and as soon as the teeth are properly aligned, the two gears will snap into engagement under the action of spring 18. To insure that the gears 14 and 19 mesh properly, gear 14 can be made slightly oversize in diameter to compensate for any effect upon engagement of the gears resulting from the clearance between aperture 15 and flatted shaft 16.

The aforesaid non-jamming gear train may be applied to a variety of mechanisms and it is to be understood that any desired mechanism can be coupled to shaft 21 to respond to the motion thereof when driven by gear 19. In the illustrated embodiment, no take off is shown, for such mechanism forms no part of the invention and has been omitted herein for the sake of clarity and brevity. Any device involving selective engagement of gears in a manner similar to the selective engagement of gears 14 and 19 could be readily adapted to use the novel non-jamming gear train, particularly those devices embodying relatively small, light weight gears adapted to be selectively engaged by a push button or some similar thrust device that could transmit force to the gears in sufficient amounts as to cause jamming.

It has been found to be particularly useful as a part of the resetting mechanism normally embodied in demand registers that are used with watthour demand meters. Such resetting mechanisms usually included a continuously driven gear corresponding to gear 14, but, unlike the resilient mounting of gear 14, such gears were rigidly attached to their driving shafts. With another rigidly attached gear in the resetting mechanism, corresponding to gear 19, adapted to be selectively engaged by the driving gear upon depression of a reset button, it was commonly found that rough handling of the reset button caused the gears to jam and thus damage the register. With the use of the aforesaid non-jamming gear train in such a resetting mechanism, it is apparent that the reset button could be mishandled with impunity, for the tiltable driving gear would move away from the driven gear upon the occurrence of any conditions tending to cause jamming of the gear train, after which the gears would promptly and easily snap into engagement.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. A non-jamming gear train comprising a continuously rotating driving gear, a rotatably mounted driving shaft on which said driving gear is mounted, said driving gear having a D-shaped centrally disposed aperture, said shaft having a flatted portion extending through said aperture whereby said driving gear is keyed thereto, said aperture being slightly larger than said flatted shaft whereby said driving gear can tilt with respect to said shaft, spring means biasing said driving gear in an axial direction, means on said shaft against which said driving gear is urged by said spring means, a driven gear, a rotatably mounted driven shaft rigidly keyed to said driven gear, said gears having a normally disengaged relative position, means for selectively engaging said driven gear with said driving gear including means for moving said driven shaft in an axial direction toward said driving gear, said driving gear tilting away from said driven gear upon contact of said gears when they are improperly aligned for engagement, said spring means moving said gears into engagement with a snap action when they are properly aligned for engagement.

2. The combination defined by claim 1 wherein said spring means comprises a coiled spring surrounding said driving shaft, and said driving gear is slightly oversize in diameter to compensate for said clearance between said aperture and said flatted shaft.

References Cited in the file of this patent
UNITED STATES PATENTS

| | | |
|---|---|---|
| 1,815,047 | Burton | July 21, 1931 |
| 2,495,689 | Bracke et al. | Jan. 31, 1950 |